March 14, 1933.   R. L. HUGHES ET AL   1,900,935
LOADING STRUCTURE FOR A SIGNALING CONDUCTOR
Filed June 17, 1931
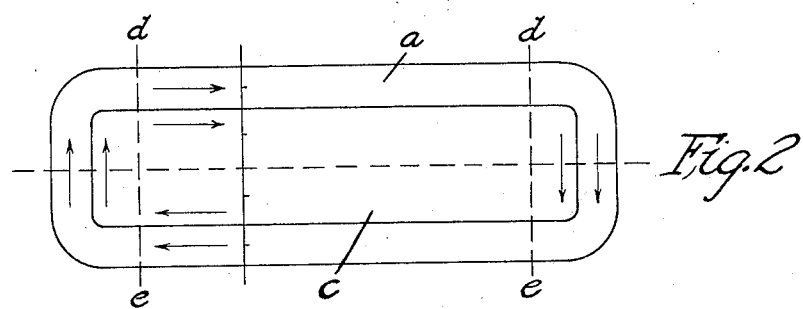
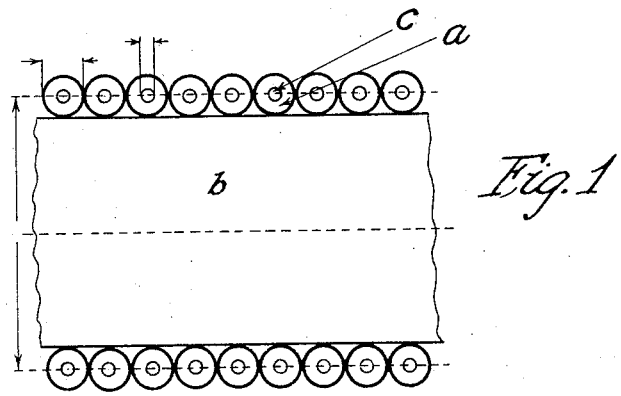
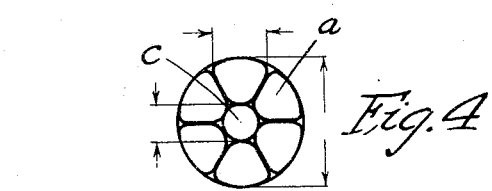
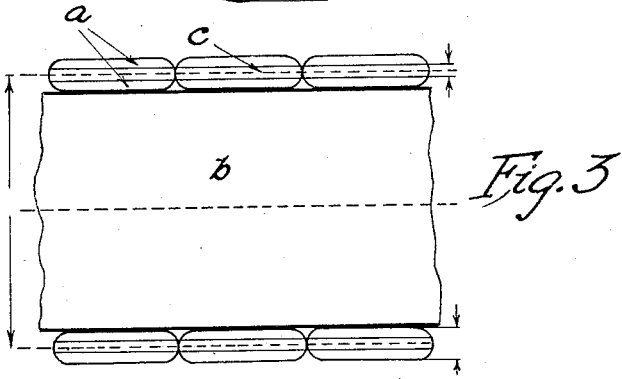
INVENTORS
RICHARD L. HUGHES
ERIC BAGULEY
BY
ATTORNEY Patented Mar. 14, 1933

1,900,935

UNITED STATES PATENT OFFICE

RICHARD LESLIE HUGHES AND ERIC BAGULEY, OF ALDWYCH, LONDON, ENGLAND, ASSIGNORS TO INTERNATIONAL STANDARD ELECTRIC CORPORATION, OF NEW YORK, N. Y.

LOADING STRUCTURE FOR A SIGNALING CONDUCTOR

Application filed June 17, 1931, Serial No. 545,002, and in Great Britain July 10, 1930.

This invention relates to loading structures and more particularly to the continuous loading of a long signaling conductor such as a submarine telephone cable.

A problem in this type of cable is to obtain sufficient added inductance without unduly increasing the added resistance caused by eddy current losses. Thus if a high permeability alloy were used as loading tape the loss due to eddy currents in the tape may be large unless the tape were very thin. Very thin tapes are generally difficult or impossible to apply. It has therefore been an object to increase the specific resistance of the loading tape whilst at the same time maintaining a high value of permeability at the flux densities likely to be encountered. It is generally known, however, that materials of highest permeability usually possess a rather low specific resistance and an object of the present invention is to overcome the problem in another way.

It has been proposed to make a composite loading wire comprising a material of very high permeability and small hysteresis loss and another of very high coercivity, the higher the better. The object of such a combination is to produce a wire having fairly high initial permeability, constancy of permeability, over a range of low magnetizing forces and small hysteresis loss. The object of the present invention is, however, quite different. It is to obtain a loading tape or wire having high permeability but also high resistivity for the purpose of limiting eddy current losses.

According to one feature of the invention a loading structure is a composite tape with a layer of high resistivity material having on each side of it a layer of material of higher permeability and lower resistivity. The centre layer may be of a known alloy comprising about 35% nickel and the remainder iron with a small percentage of chromium or silicon, whilst the outer layers may be of nickel iron alloy heat treated in known manner and in the known proportions to possess high permeability at the flux densities concerned.

The different layers may be insulated from one another by a thin film of insulating material such as, for example, is mentioned in U. S. application No. 429,454 filed February 18th, 1930, and the construction of the composite tape may be effected as mentioned in said U. S. application.

Where no insulation is used it is thought preferable to manufacture the composite tape by continuously welding together three tapes in the order stated and then rolling the composite tape down to the requisite dimensions. In some cases it may be possible to dispense with this subsequent rolling. As an alternative method of manufacture the loading structure may be in the form of a homogeneous tape whose outer layers are treated to alter the magnetic characteristics, i. e. to produce a high permeability layer on the outside and a high resistivity layer on the inside. In such a structure it would be advisable to trim the edges of the composite tape so that the edges of the outer layers were not in contact.

The overall thickness of the tape would be in the order of 0.002 inches.

The composite layer may be built up by depositing a layer of metal or alloy on the surface of a tape of high specific resistance. The deposited layers would be heat treated to give a high value of permeability. Alternatively the outer layers may be produced or treated by cementation. For example a nickel core may have iron diffused into its surface thus forming a high permeability alloy.

According to another feature of the invention a loaded conductor has loading in the form of a composite wire the inside of which is of high resistivity and the outside of high permeability. With known materials the inside would therefore have comparatively low permeability and the outside comparatively low resistivity. The structure could be made by starting with a composite bar and drawing it down to wire form, and in this case there is no appreciable gain by insulating the materials from one another. The wire could also be produced by any of the methods referred to above in the consideration of the composite tape, such as by passing a homogeneous wire through a treatment to alter the outer layers. For example the wire may have a diameter of 2.55 mils with a core of 2.03 mils diameter and an outer skin 0.26 mils thick.

According to a further feature of the invention a loading structure is in the form of a stranded unit of wires which may or may not be insulated from one another the innermost wire having higher resistivity and lower permeability than the outermost wires.

The wires of strand may all be of the same material, some of the strand wires being treated to change their characteristics, but usually it would be preferable to use wires of different materials. Thus the final characteristics may be obtained by selection of the wires and by suitable composition.

A further advantage of the use of any form of laminated loading consisting of two materials is that by a suitable selection of materials the variation of permeability with field strength can be reduced at least over a portion of the range, as a material having the characteristics that permeability falls with increasing field strength over a certain part of the range can be combined with one having a rising permeability over the same range.

The invention is illustrated by way of example in the accompanying drawing in which:—

Fig. 1 shows a portion of a conductor loaded with a composite wire.

Fig. 2 is a diagrammatic end view of a composite tape.

Fig. 3 shows a portion of a conductor loaded with a composite tape.

Fig. 4 is an end view of a modified form of composite wire.

Like reference characters refer to like parts in the various figures.

Fig. 1 illustrates a conductor $b$ loaded by means of composite wires $ca$. $c$ is a core of high resistivity material and $a$ is the outer layer of high permeability material. Fig. 2 shows a composite tape which may be used instead of the wire of Fig. 1. The tape comprises a core $c$ of high resistivity material and an outer layer $a$ of high permeability material. The arrows indicate eddy currents and it will be seen that if the edges of this tape are trimmed off, for example at the lines $d$, $e$, the circuit for eddy currents in the outer layer will be broken with a consequent reduction in eddy current loss.

Fig. 3 illustrates the tape of Fig. 2 applied to a conductor $b$. In this case the edges of the tape have been trimmed.

Fig. 4 shows an alternative method of breaking the continuity of the eddy current path in the outer layer of a composite loading wire. Here again, $c$ is the centre core of high resistivity. The outer layer of high permeability is composed of a number of wires $a$. Each of these wires may be insulated or contact resistance alone may be relied upon.

The above description has had particular reference to a composite tape with three layers but obviously it would not be outside the scope of this invention to employ more or less of such layers. This also applies to the composite wire type of loading.

What is claimed is:

1. A loading material comprising a centre core and an outer layer in which the centre core is of higher resistivity than the outer layer and the outer layer is of higher permeability than the core.

2. A loading tape comprising a central strip and outer strips said central strip being of higher resistivity material than the outer strips and said outer strips being of high permeability material, the outer strips of adjacent tapes being free from contact at the edges.

3. A loading tape according to claim 2 wherein the strips are insulated from each other.

4. A composite loading wire comprising a core of higher resistivity material than the outer layer and the outer layer of high permeability material drawn to the requisite dimensions.

5. A loading material according to claim 1 wherein outer layers are formed from the same material as the core and are treated to give their different characteristics.

6. A loading material according to claim 1 wherein several layers of high permeability material are assembled about a core of high resistivity material.

7. A continuously loaded cable in which the loading comprises the material according to claim 1.

8. The combination with an electric conductor of a loading material wound about said conductor and comprising an intermediate layer and outer layers whereof the intermediate layer is of higher resistivity material than the outer layers and an outer layer is of high permeability material.

9. The combination with an electric conductor of a loading material wound about said conductor and comprising a windable strip having core of higher resistivity material than the surrounding layers and surrounding layers of high permeability material.

In witness whereof we hereunto subscribe our names this twenty-ninth day of April, 1931.

RICHARD LESLIE HUGHES.
ERIC BAGULEY.